US011550109B2

(12) United States Patent
Chen et al.

(10) Patent No.: US 11,550,109 B2
(45) Date of Patent: Jan. 10, 2023

(54) NETWORK DEVICE INCLUDING LAYERED FIBER OPTIC CABLING

(71) Applicant: QUANTA COMPUTER INC., Taoyuan (TW)

(72) Inventors: Chao-Jung Chen, Taoyuan (TW); Hou-Hsien Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 66 days.

(21) Appl. No.: 17/203,513

(22) Filed: Mar. 16, 2021

(65) Prior Publication Data

US 2022/0196954 A1 Jun. 23, 2022

Related U.S. Application Data

(60) Provisional application No. 63/130,176, filed on Dec. 23, 2020.

(51) Int. Cl.
*G02B 6/44* (2006.01)

(52) U.S. Cl.
CPC ......... *G02B 6/4452* (2013.01); *G02B 6/4453* (2013.01); *G02B 6/4471* (2013.01)

(58) Field of Classification Search
CPC .................................................. G02B 6/4453
See application file for complete search history.

(56) References Cited

U.S. PATENT DOCUMENTS

| | | | | |
|---|---|---|---|---|
| 5,784,516 A | * | 7/1998 | Parzygnat | H04Q 1/14 385/134 |
| 10,514,518 B1 | * | 12/2019 | Livingston | G02B 6/4452 |
| 2016/0313525 A1 | * | 10/2016 | Fletcher | G02B 6/4453 |
| 2019/0196128 A1 | * | 6/2019 | Grunwald | H04Q 1/131 |

* cited by examiner

*Primary Examiner* — Sung H Pak
(74) *Attorney, Agent, or Firm* — Nixon Peabody LLP

(57) ABSTRACT

A network device comprising a chassis, a plurality of fiber optic adapters, a plurality of arrangements of interior fiber optic cables, and a plurality of stacked cable management trays. The chassis includes a front panel with a plurality of front fiber optic adapter openings. The chassis defines an interior space. The plurality of front fiber optic adapters is disposed in the front fiber optic adapter openings. The plurality of arrangements of interior fiber optic cables is disposed within the interior space. A first end of each interior fiber optic cable is directly connected to a corresponding one of the plurality of front fiber optic adapters. The plurality of stacked cable management trays each support one of the plurality of arrangements of interior fiber optic cables. The plurality of stacked cable management trays is configured to route a second end of each interior fiber optic cable to a corresponding side fiber optic adapter.

18 Claims, 12 Drawing Sheets

NETWORK DEVICE INCLUDING LAYERED FIBER OPTIC CABLING

CROSS-REFERENCE TO RELATED APPLICATIONS

This application claims priority from and the benefits of U.S. Provisional Patent Application Ser. No. 63/130,176, filed on Dec. 23, 2020, titled "Layered Cabling Within The System," which is hereby incorporated by reference herein in its entirety.

FIELD OF THE INVENTION

The present invention relates generally to a network device, and more specifically, to a network device including stacked cable management trays supporting arrangements of fiber optic cables.

BACKGROUND OF THE INVENTION

Fiber optic cables are fragile and typically require a large amount of space for cable management. Minimum bending radius, maintenance, and assembly sequence are factors considered for placement of fiber optic cables in a computing system. In a server system or a switch system, active optical cable transceivers are used to receive optical signal from a switch or a server. The active optical cable transceivers are typically connected to adapters of a network device. The active optical cables consume significant space on or around the network device. Accordingly, there is a need for increased efficiency in cabling of network devices.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain implementation of the present disclosure, a network device, including integrated optics, comprises a chassis defining an interior space, a plurality of front fiber optic adapters, a plurality of arrangements of interior fiber optic cables, and a plurality of stacked cable management trays. The chassis includes a front panel with a plurality of front fiber optic adapter openings. The plurality of front fiber optic adapters is disposed in the plurality of front fiber optic adapter openings. The plurality of arrangements of interior fiber optic cables are disposed within the interior space. A first end of each interior fiber optic cable is directly connected to a corresponding one of the plurality of front fiber optic adapters. The plurality of stacked cable management trays each supports one of the plurality of arrangements of interior fiber optic cables. The plurality of stacked cable management trays is configured to route a second end of each interior fiber optic cable to a corresponding side fiber optic adapter.

In a further aspect of the implementation, the network device is a switch including a switch module comprising a motherboard, a central processing unit, an optical engine, a replication engine, and a forwarding engine. In yet a further aspect, the switch module is disposed above the plurality of stacked cable management trays. In a further aspect, the optical engine of the switch module is connected with a plurality of fiber optic pig tails. Each fiber optic pig tail extends from the optical engine to a corresponding side fiber optic adapter.

In a further aspect of the implementation, the network device is a server including a server module comprising a motherboard, a central processing unit, an optical engine, and memory. In a further aspect, the server module is disposed above the plurality of stacked cable management trays. In yet a further aspect, the optical engine of the server module is connected with a plurality of fiber optic pig tails. Each fiber optic pig tail extends from the optical engine to a corresponding side fiber optic adapter.

In a further aspect of the implementation, the plurality of stacked cable management trays includes at least three cable management trays.

In a further aspect of the implementation, the side fiber optic adapters are positioned on a side wall of the chassis and adjacent to each other along a horizontal plane parallel to a base of the chassis. In a further aspect, the side fiber optic adapters disposed in the side walls of the chassis are configured to receive optical signals as inputs from an optical engine.

In a further aspect of the implementation, the plurality of front fiber optic adapters have SN® adapters configured to receive a corresponding SN® duplex connector.

In a further aspect of the implementation, a front section of each of the stacked cable management trays has a first horizontal row of adjacent receiving slots for individually securing each of the plurality of front fiber optic adapters. In a further aspect, a front section of a second one of the stacked cable management trays includes a second horizontal row of adjacent receiving slots stacked immediately above the first horizontal row.

In a further aspect of the implementation, the plurality of front fiber optic adapters is disposed in the front fiber optic adapter openings are configured to provide optical signal outputs for receipt by a device external to the network device.

In a further aspect of the implementation, a lowest of the plurality of stacked cable management trays is substantially flat. In a further aspect, a highest of the plurality of stacked cable management trays has at least two bends in a supporting portion thereof. In yet a further aspect, an intermediate one of the plurality of stacked cable management trays includes an elongated supporting section disposed immediately above, and providing a tunnel for, fiber optic cables supported on an elongated supporting section of a lower one of the plurality of stacked cable management trays disposed below the intermediate one of the plurality of stacked cable management trays.

In a further aspect of the implementation, each of the plurality of front fiber optic adapters is configured to directly receive a corresponding connector of an external fiber optic cable.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The present disclosure, and its advantages, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
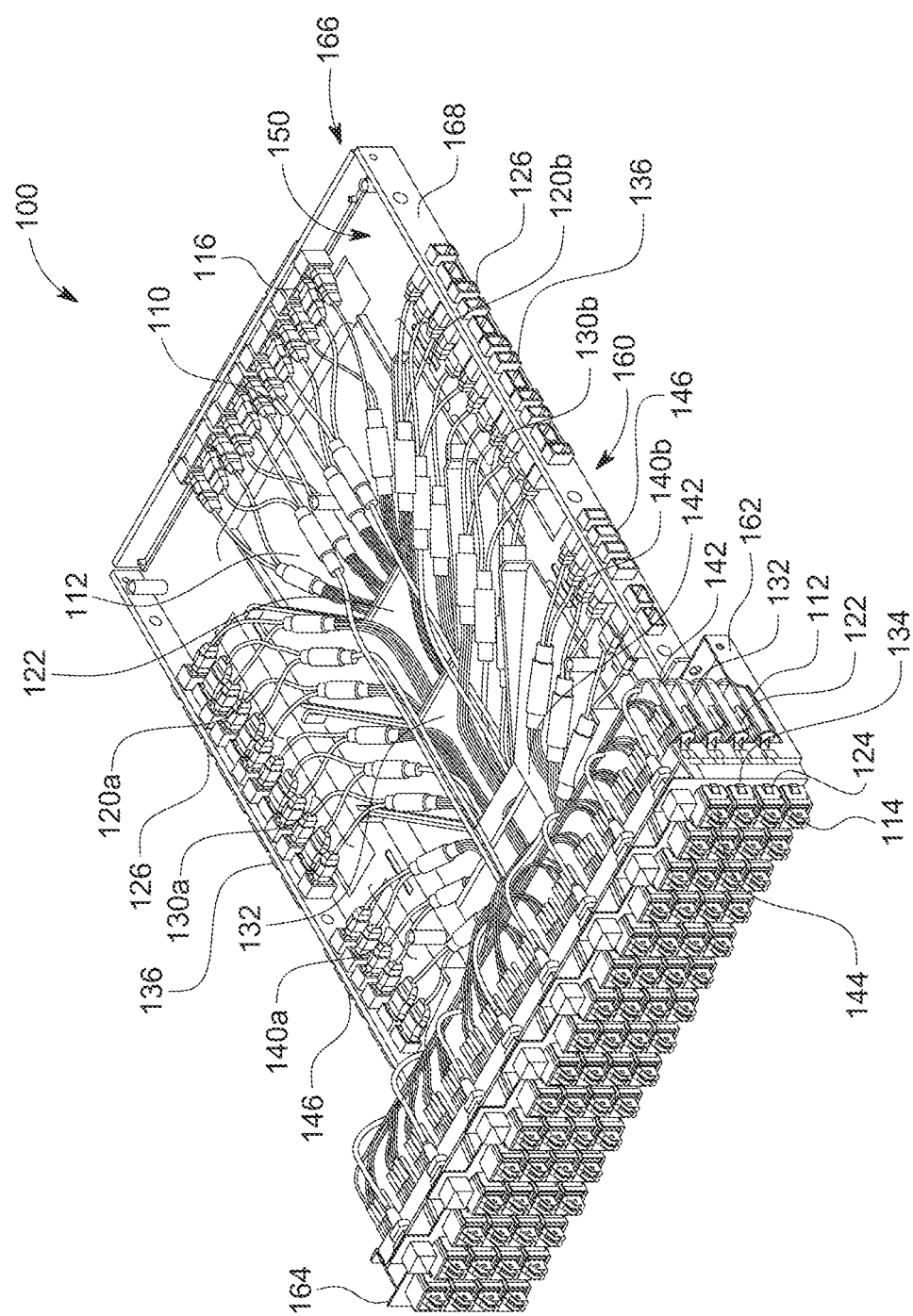
FIG. 1 is a front perspective view of an exemplary layered cabling component including a plurality of arrangements of fiber optic cables disposed in an interior space of a supporting chassis, according to certain aspects of the present disclosure.

A network device is described that includes integrated fiber optics using stacked cable management trays for fiber optic cables that correspond to connection ports on the front panel of the network device allowing connections to external devices. The cable management trays allow a technician to install the tray in the network device chassis in a stacked arrangement with the fiber optic cables pre-routed on the cable management trays. The improved network device desirably minimizes or eliminates the need for active optical cable transceivers to, for example, receive optical signals from connection ports on the front panel of the network device. By minimizing or eliminating the active optical cable transceiver, the present disclosure provides space-saving improvements for network devices that have fiber optic cabling, such as switch devices and server devices.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring now to FIG. 1, a front perspective view of a layered cabling component 100 of a network device (e.g., network device 300 in FIG. 3) is depicted. The layered cabling component 100 integrates a plurality of arrangements of interior fiber optic cables 110, 120a-b, 130a-b, 140a-b into an interior space 150 of a support chassis 160 for the layered cabling component 100. The support chassis 160 can include a front section 162 positioned toward what would be the operative front end of a network device and a rear section 166 positioned toward the operative middle or rear end of the network device. The front section 162 can further include a front panel 164 that may be exposed to an exterior of the network device. The front panel 164 supports a plurality of front fiber optic adapters 114, 124, 134, 144 disposed in corresponding front fiber optic adapter openings (e.g., see exemplary representative front fiber optic adapter openings 118, 128, 138, 148 in FIG. 5) in the front panel 164.

The support chassis 160 defines the interior space 150 for positioning cable management trays 112, 122, 132, 142 that support corresponding arrangements of the interior fiber optic cables 110, 120a-b, 130a-b, 140a-b. Individual fiber optic cables in the arrangements of interior fiber optic cables 110, 120a-b, 130a-b, 140a-b are connected at one end at the front panel 164 to a corresponding front fiber optic adapter that is part of a horizontal row of front fiber optic adapters, such as exemplary front fiber optic adapters 114, 124, 134, 144. The horizontal row of fiber optic adapters provide a fiber optic connection to a connector external to the network device. A second end of the individual fiber optic cables in the arrangements of interior fiber optic cables 110, 120a-b, 130a-b, 140a-b is connected to a side fiber optic adapter, such as exemplary side fiber optic adapters 116, 126, 136, 146, which are supported by side walls 168 of the rear section 166 of the support chassis 160.

The cable management trays 112, 122, 132, 142 are positioned in a stacked arrangement within the interior space 150 of the support chassis 160. Each of the cable management trays 112, 122, 132, 142 supports one of the plurality of arrangements of interior fiber optic cables 110, 120a-b, 130a-b, 140a-b.

Figure 2:
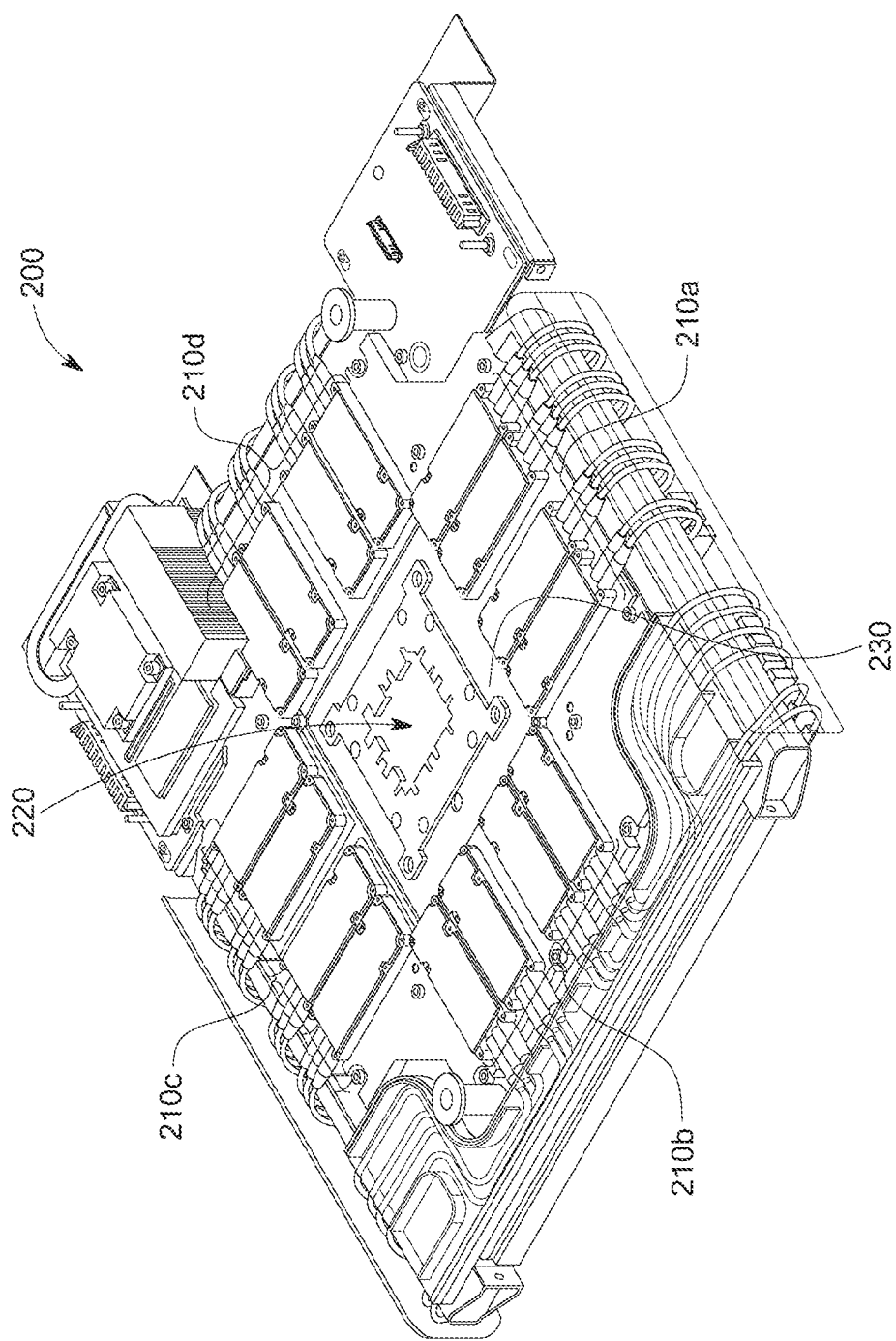
FIG. 2 is a front perspective view of an exemplary module depicting an optical engine integrated with a central processing unit, according to certain aspects of the present disclosure.

Referring to FIG. 2, a front perspective view of an exemplary module 200 is depicted including at least one optical engine, such as optical engines 210a, 210b, 210c, 210d, integrated with a central processing unit 220 disposed on a motherboard 230. In some implementations, the module 200 can be a switch for connecting multiple devices, such as server devices, to allow communication on the same network within, for example, a data center. When the module 200 is configured as a switch, it acts as a controller for transmitting data between the connected devices. For example, the module 200 can manage the flow of data across the network of connected devices by transmitting received network packets to the one or more devices for which the packets are intended. In some implementations, the switch further comprises a replication engine and a forwarding engine.

In some implementations, the exemplary module 200 can be a server device for storing data and executing tasks. For example, when configured as a server, the module 200 can further comprise random access memory and a storage device, along with computer implemented instructions for executing the tasks.

Figure 3:
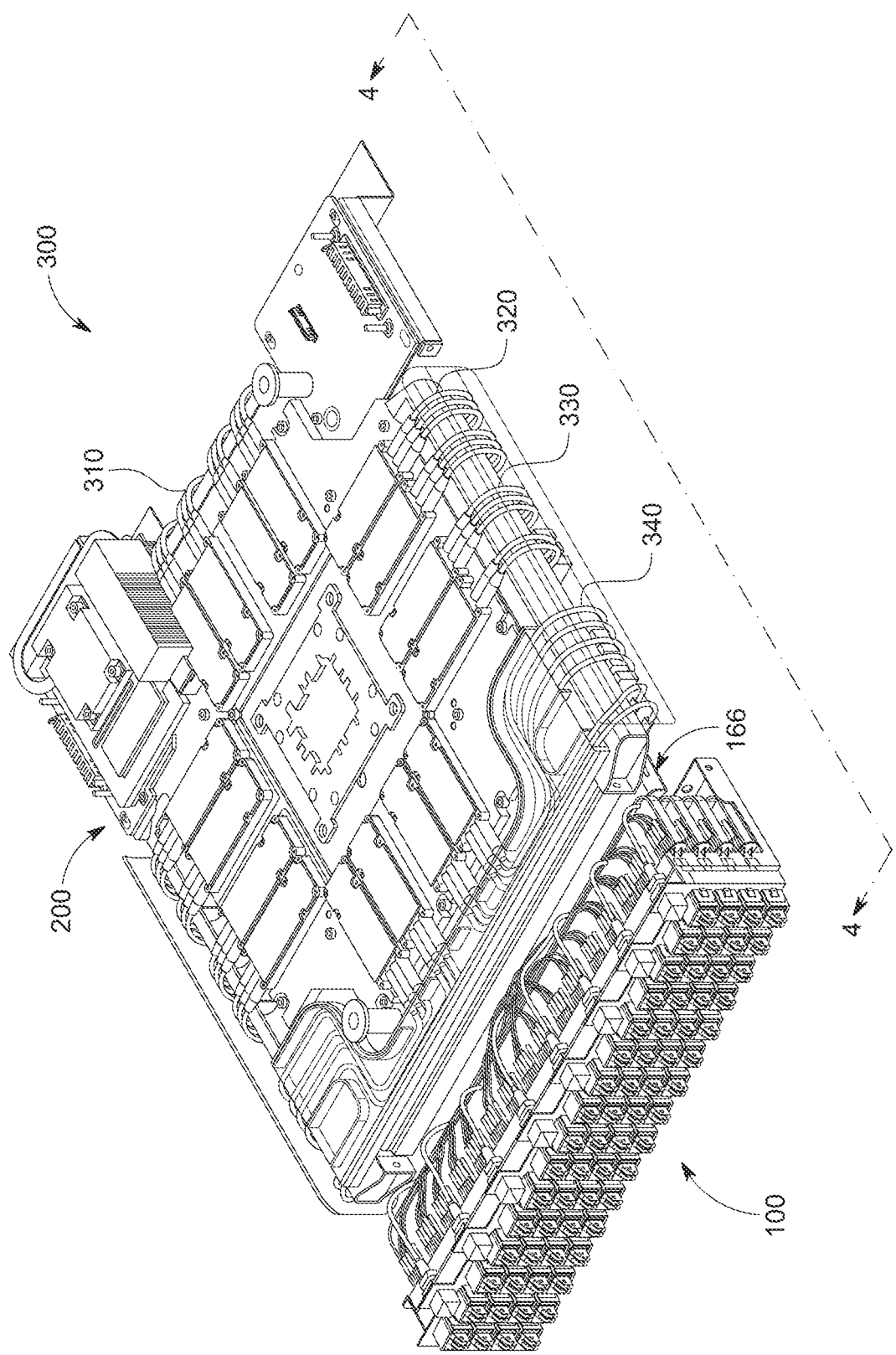
FIG. 3 is a front perspective view depicting a network device including the layered cabling component of FIG. 1 disposed on top of the module of FIG. 2, according to certain aspects of the present disclosure.

To provide a compact and space-saving configuration for a network device, such as a switch or server, it is contemplated that the module 200 can be positioned to form a network device 300, as depicted in FIG. 3. Network device 300 includes the layered cabling component 100 from FIG. 1, with the module 200 of FIG. 2 secured above the rear section 166 of the support chassis 160 (see FIG. 1). The module 200 can also be positioned above the portions of the plurality of stacked cable management trays 112, 122, 132, 142 within the interior space 150 depicted in FIG. 1. The depicted configuration for the network device 300 provides for more streamlined upgrades of system bandwidth and minimizes or eliminates the need for additional active optical cable transceivers.

In some implementations, the optical engine, such as optical engines 210a-d, of the switch or the server configurations of module 200, can include a plurality of fiber optic pig tails, such as exemplary representative fiber optic pig tails 310, 320, 330, 340. The fiber optic pig tails can extend from their respective optical engines (e.g., optical engines 210a, 210b, 210d), to corresponding side fiber optic adapters, such as exemplary representative side fiber optic adapters 116, 126, 136, 146 (see FIG. 1) of the layered cabling component 100. The fiber optic pig tails provide a direct optical connection between the module 200 and the fiber optic cables of the layered cabling component 100. The side fiber optic adapters 116, 126, 136, 146 receive optical signals from module 200 via the plurality of fiber optic pig tails 310, 320, 330, 340.

Figure 4:
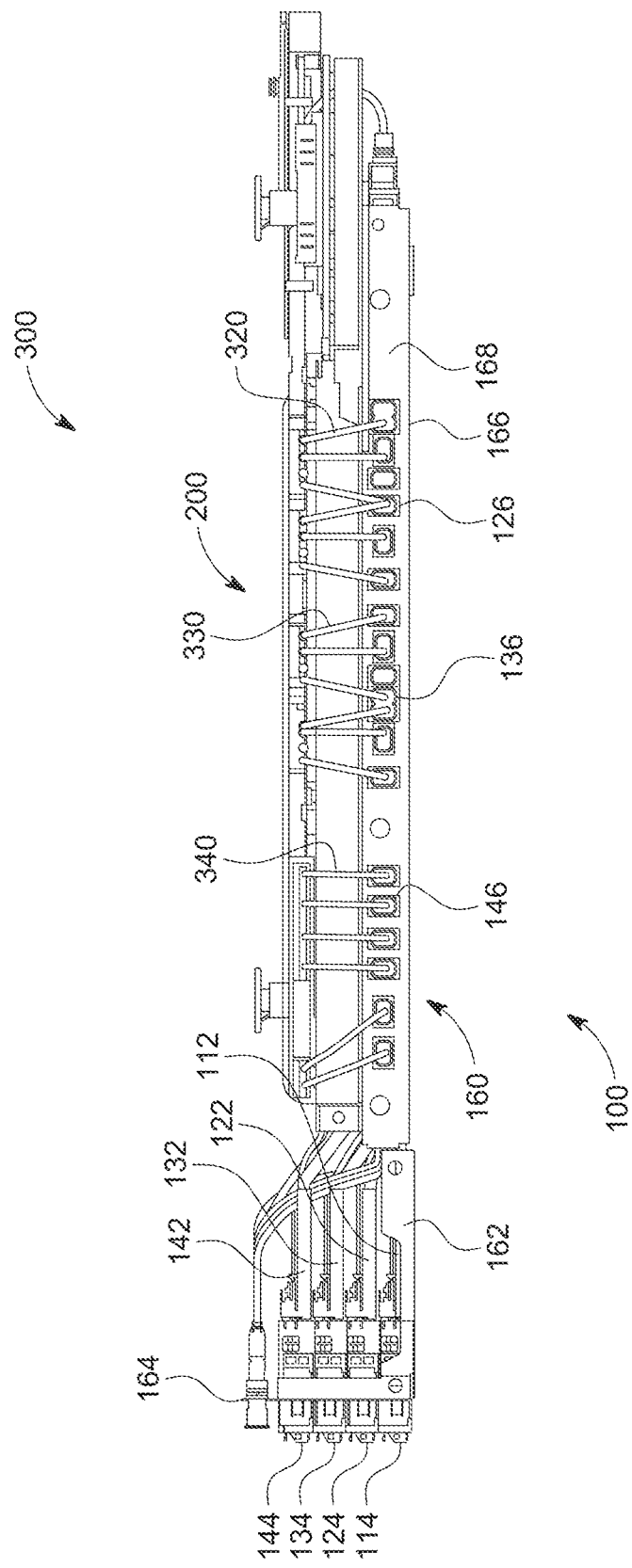
FIG. 4 is a side view of the combined module and layered cabling component depicted in FIG. 3, according to certain aspects of the present disclosure.

Referring to FIG. 4, a side view of a combination of the layered cabling component 100 and the module 200 (e.g., server module, switch module) from FIG. 3 is depicted. A more detailed view is provided of one side of the layered cabling component 100 including select side fiber optic adapters, such as exemplary side fiber optic adapters 126, 136, 146, that are supported by the side wall 168 of the rear section 166 of support chassis 160. The side view further details front portions (see, for example, front portions 716, 726, 736, 746 in FIGS. 8-11) of the cable management trays 112, 122, 132, 142 (see also FIG. 1) disposed above the front section 162 of the support chassis 160. Additionally, exemplary aspects of the plurality of fiber optic pig tails 320, 330, 340 are depicted that provide an optical data connection between the module 200 and the arrangements of interior fiber optic cables 110, 120a-b, 130a-b, 140a-b (see FIG. 1) of the network device 300. The plurality of fiber optic pig tails provides connections to devices external to the network device 300 at the front panel 164 via one or more of the representative front fiber optic adapters 114, 124, 134, 144.

Figure 5:
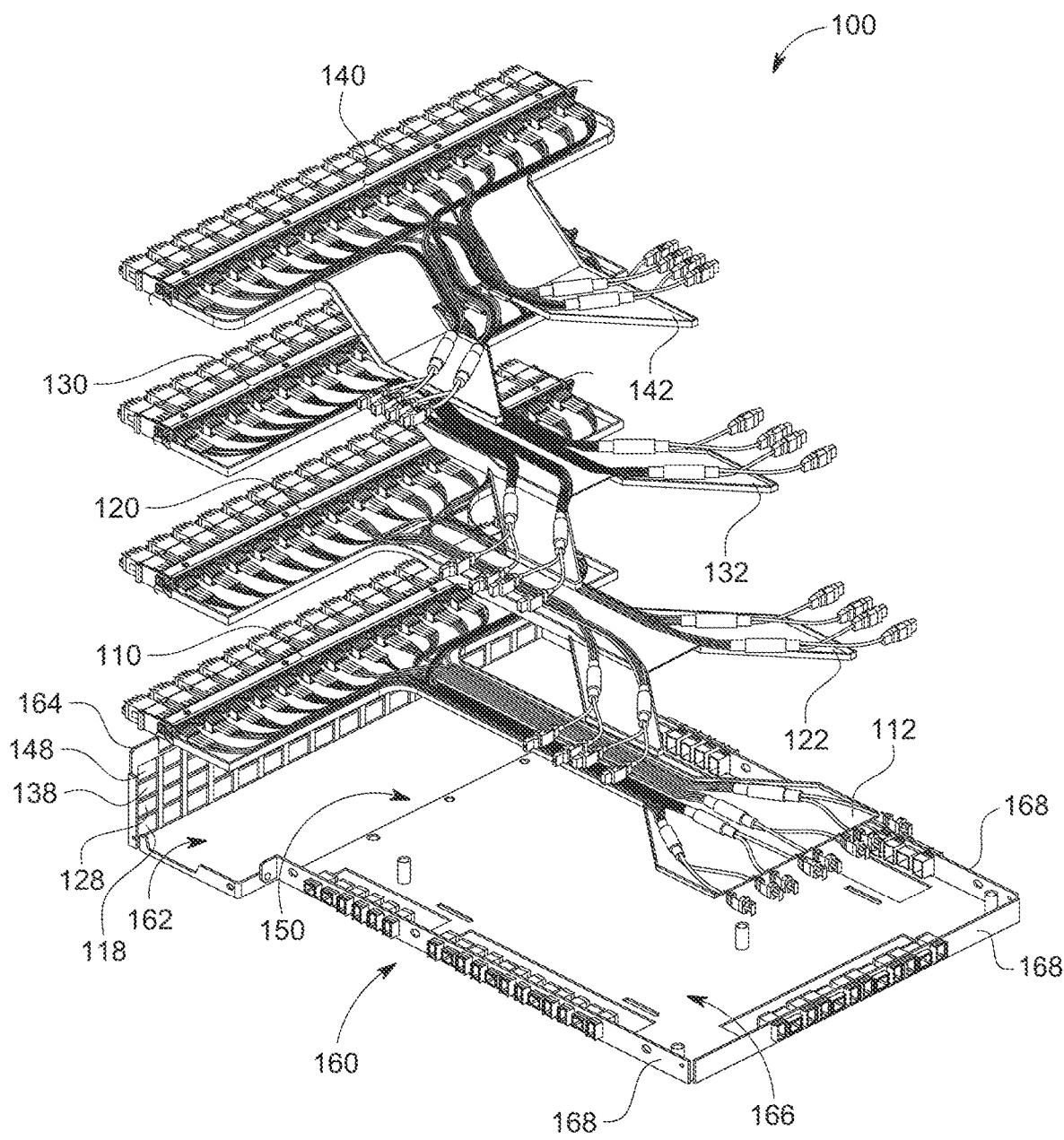
FIG. 5 is an exploded rear perspective view of the layered cabling component of FIG. 1 including stacked cable management trays and arrangements of interior fiber optic cables, according to certain aspects of the present disclosure.
Figure 6:
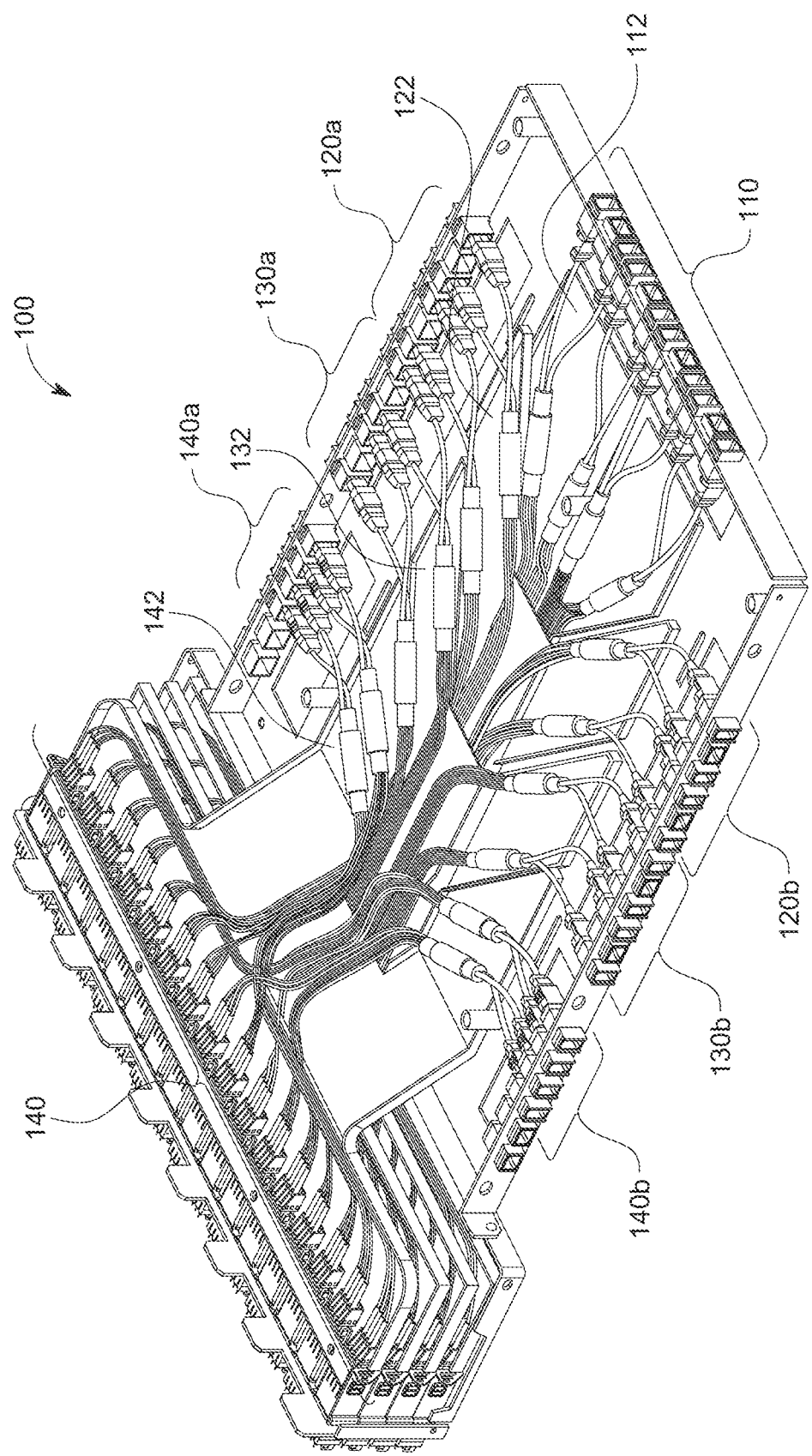
FIG. 6 is a rear perspective view of the assembled layered cabling component with the stacked cable management trays and arrangements of interior fiber optic cables of FIG. 5, according to certain aspects of the present disclosure.

Referring now to FIGS. 5 and 6, an exploded and an assembled rear perspective view of the layered cabling component 100 of FIG. 1 is respectively depicted, including the stacked cable management trays 112, 122, 132, 142 and arrangements of interior fiber optic cables 110, 120, 120a-b, 130, 130a-b, 140, 140a-b. A more detailed view of the support chassis 160 is also depicted, including the rear section 166, the front section 162, the front panel 164, the interior space 150, and a plurality of horizontal rows of front fiber optic adapter openings (e.g., see exemplary front fiber optic adapter openings 118, 128, 138, 148) in front panel 164.

While the layered cabling component 100 has been depicted with stacked cable management trays 112, 122, 132, 142, it is contemplated that the plurality of stackable cable management trays can include more or fewer than four cable management trays. For example, in some implementations, a plurality of stacked cable management trays includes at least two, at least three, or at least five cable management trays.

Figure 7:
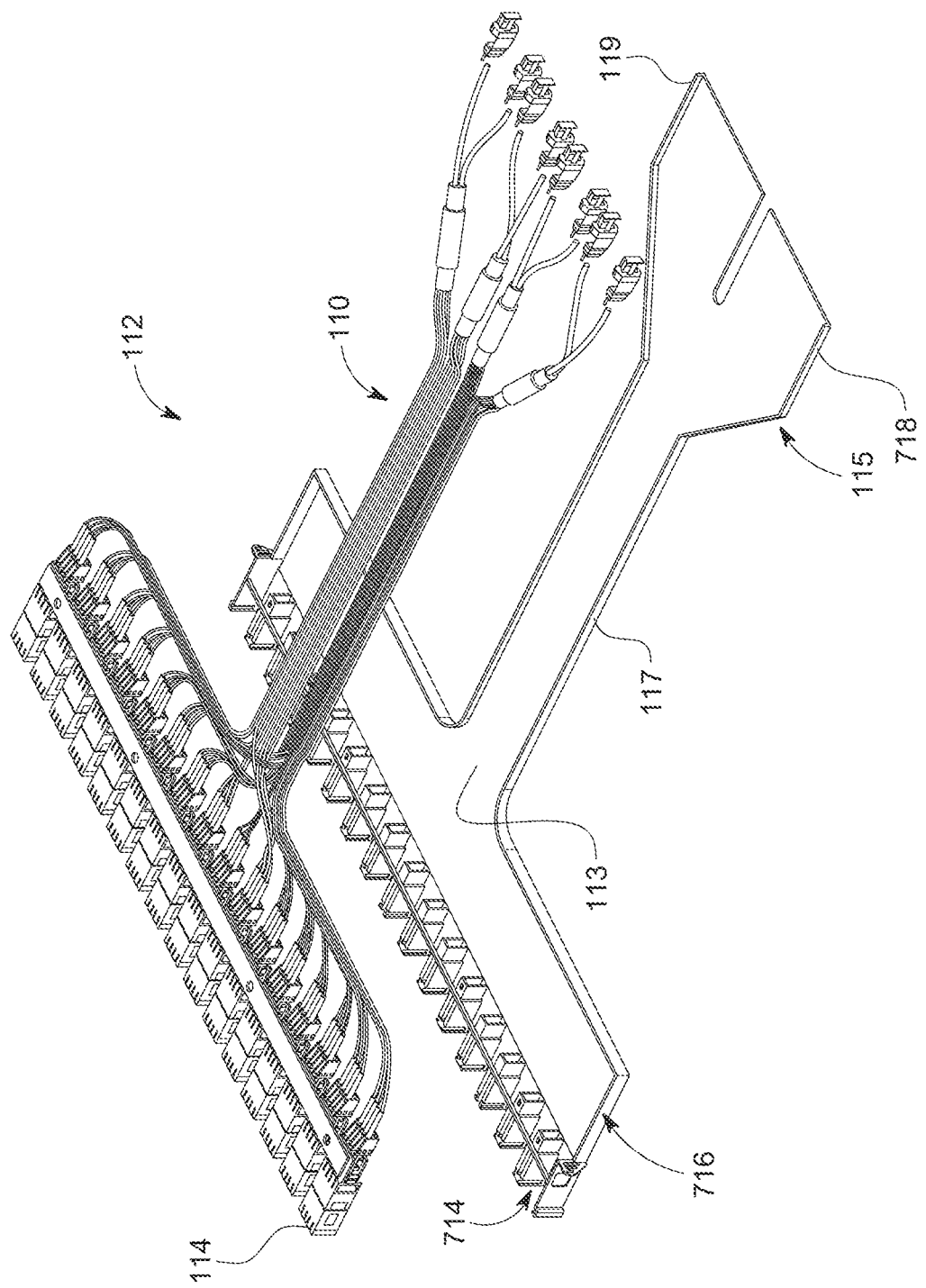
FIG. 7 is an exploded rear perspective view of an exemplary bottom cable management tray including an arrangement of interior fiber optic cables for the network device, according to certain aspects of the present disclosure.
Figure 8:
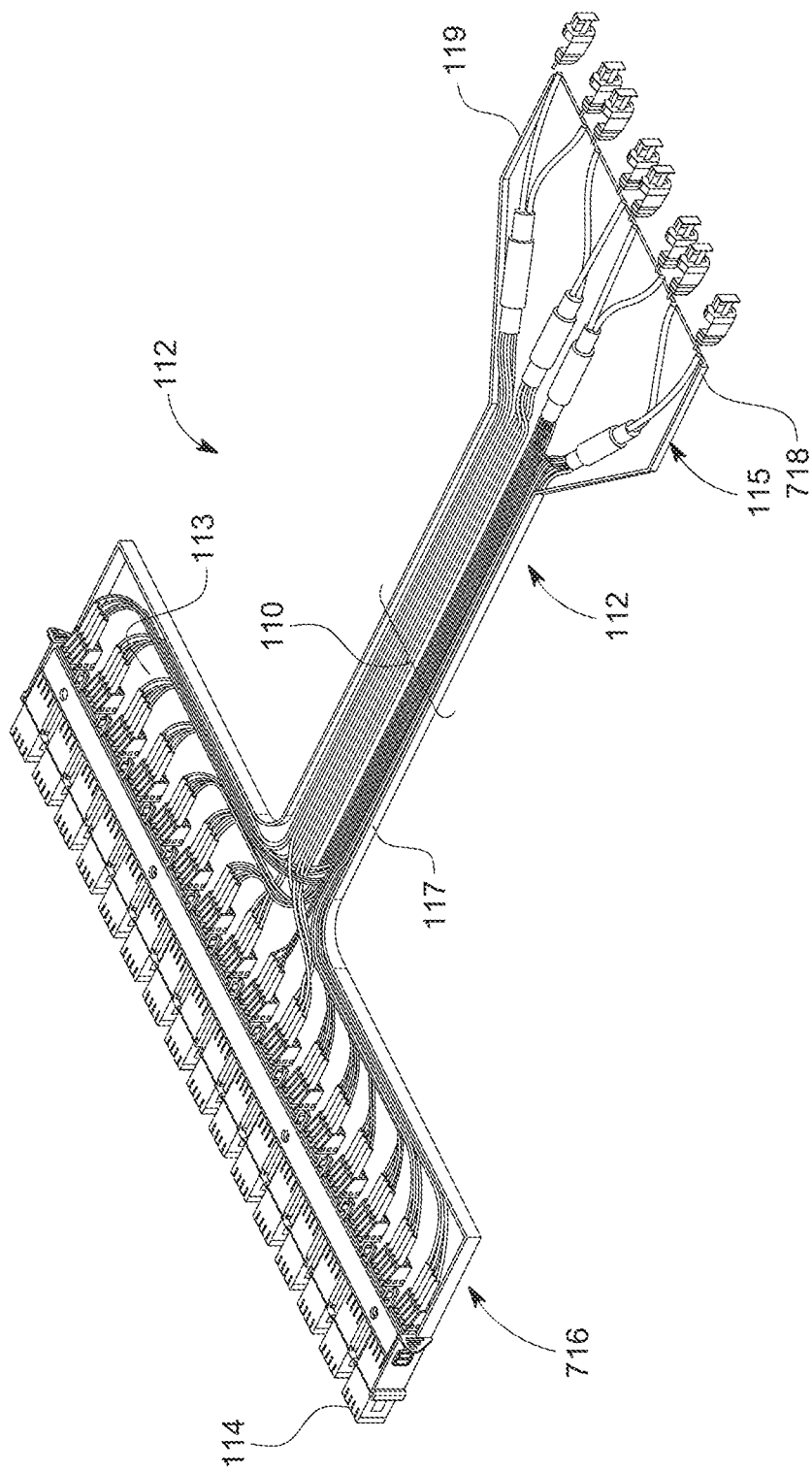
FIG. 8 is a rear perspective view of the exemplary arrangement of interior fiber optics cables of FIG. 7 disposed on the cable management tray, according to certain aspects of the present disclosure.

Referring now to FIGS. 7 and 8, an exploded and an assembled rear perspective view of a bottom cable management tray 112 including an arrangement of interior fiber optic cables 110 is respectively depicted. The bottom cable management tray 112 includes a T-shape at a front portion 716 formed together with an elongated section 117, followed by one or more arms 718, 119 extending at a back portion 115 of the cable management tray 112 from the elongated section 117. The back portion 115, front portion 716, and elongated section 117 of the bottom cable management tray 112 are generally flat with all three portions generally along the same plane. It is contemplated that each section can be shaped differently than depicted in FIGS. 7 and 8. For example, the front portion 716 can be shaped to conform with a front panel of layered cabling component of a network device. The supporting surface 113 of the three portions of the bottom cable management tray 112 is sized to allow for at least the minimum bending radius and assembly sequencing of the arrangement of interior fiber optic cables 110.

FIG. 7 further depicts exemplary adjacent receiving slots 714 that are shown as part of front portion 716 for bottom cable management tray 112. Similar receiving slots can be included for each of the stacked cable management trays, such as cable management trays 122, 132, 142 (see FIGS. 9-11). The adjacent receiving slots can be arranged in a group, such as a horizontal row, and are used to individually secure corresponding ones of the plurality of front fiber optic adapters. For example, for the bottom cable management tray 112, the representative front fiber optic adapter 114 is secure in the representative receiving slot 714 by placing the adapter 114 into the slot 714. In some implementations, each of the stacked cable management trays (e.g., bottom tray 112) include a horizontal row of adjacent receiving slots (e.g., slot 714) for individually securing corresponding ones of the plurality of front fiber optic adapters (e.g., adapter 114).

It is contemplated that the horizontal rows or groups of adjacent receiving slots are stacked or positioned one immediately above the other within the front panel of the layered cabling component, as depicted, for example, in FIG. 2. It is further contemplated that the plurality of front fiber optic adapters (e.g., adapter 114) for the assembled bottom cable management tray 112 can then be placed into corresponding front fiber optic adapter openings (e.g., opening 118 in FIG. 5) in the front panel 164.

Figure 9:
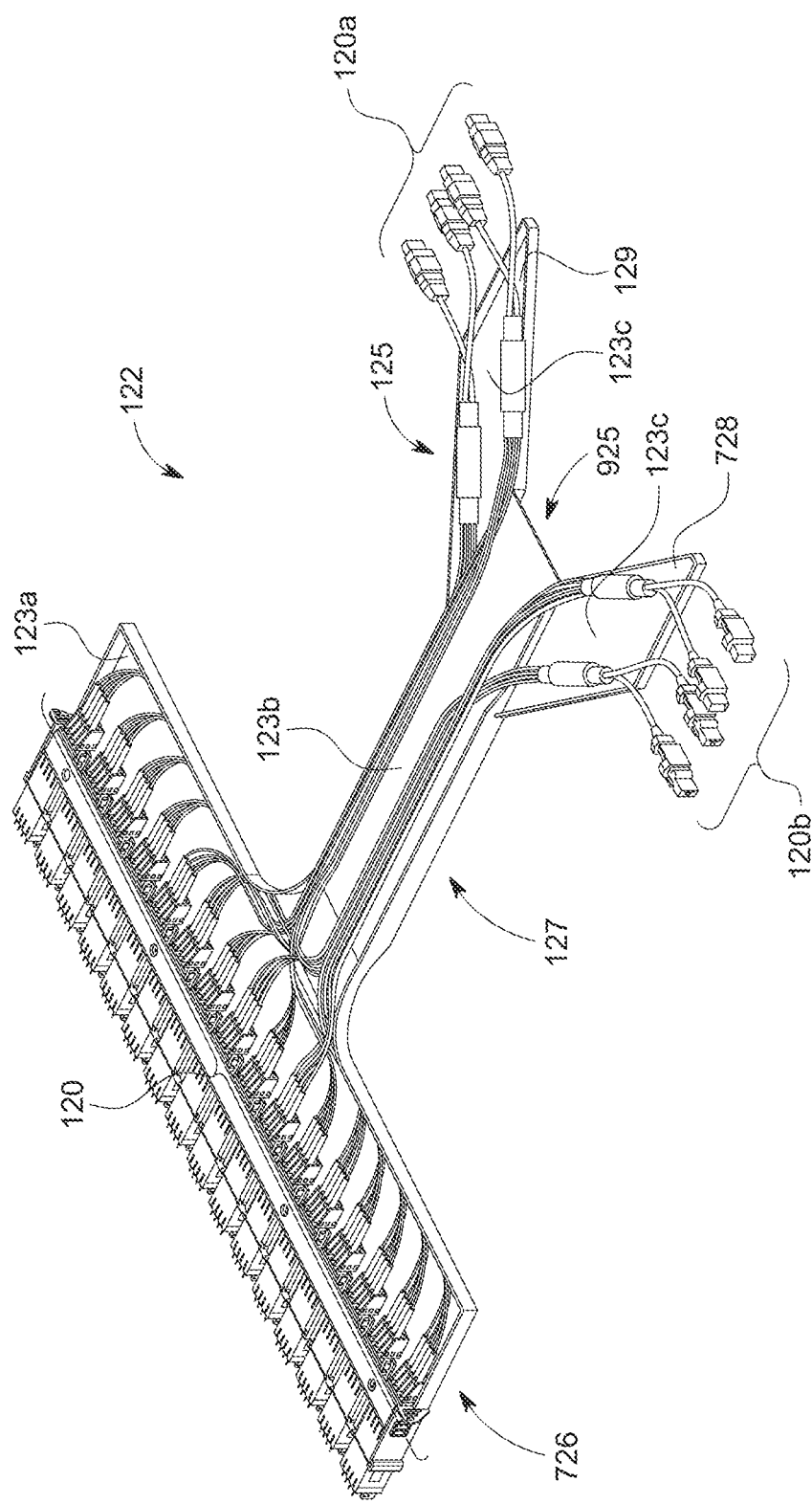
FIG. 9 is a rear perspective view of an exemplary intermediate cable management tray and arrangement of interior fiber optic cables that are stackable above the cable management tray of FIG. 8, according to certain aspects of the present disclosure.
Figure 10:
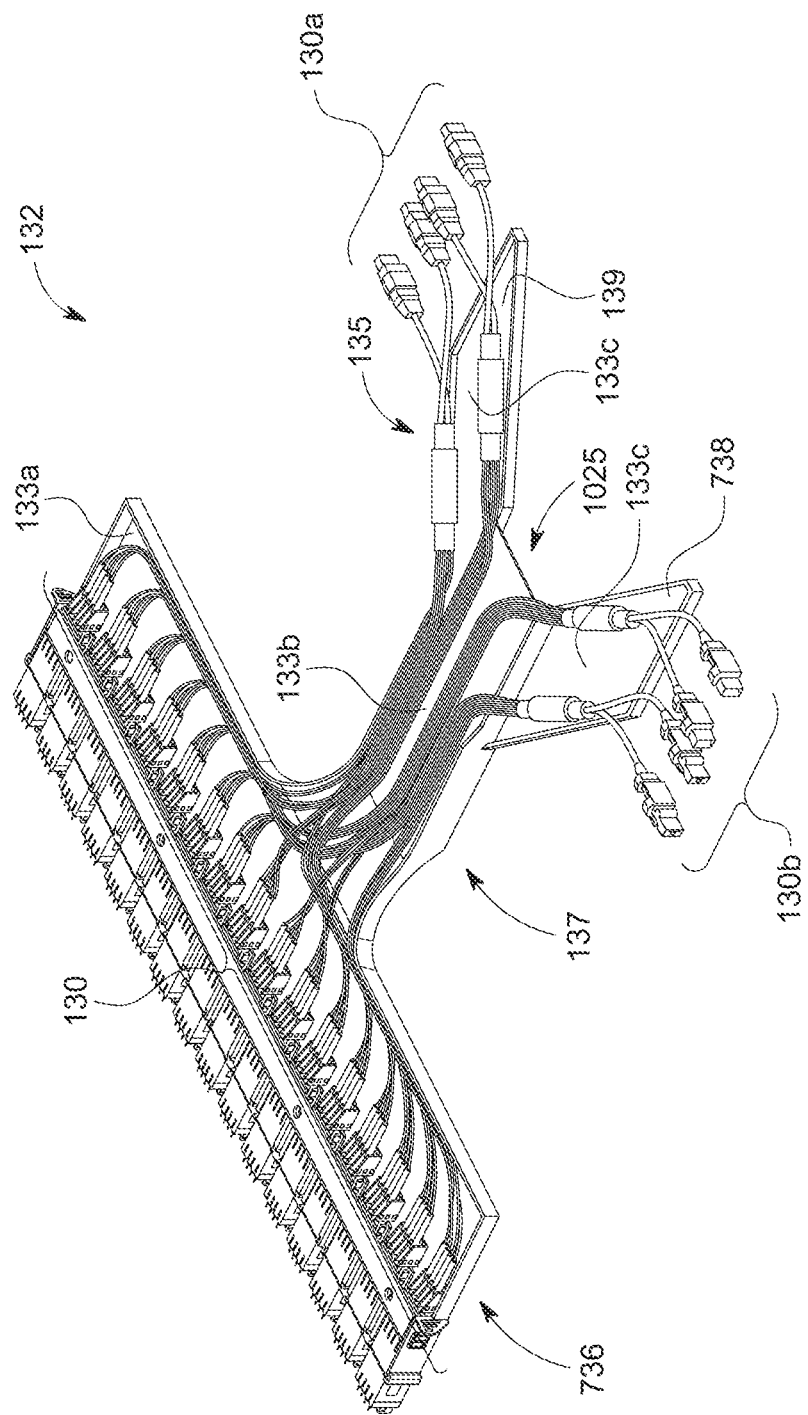
FIG. 10 is a rear perspective view of another exemplary intermediate cable management tray and arrangement of interior fiber optic cables that are stackable above the cable management trays of FIGS. 8 to 9, according to certain aspects of the present disclosure.

Referring to FIGS. 9 and 10, rear perspective views of two different intermediate cable management trays 122, 132 (e.g., cable management trays between a highest and lowest cable management tray) and corresponding arrangements of interior fiber optic cables 120, 120a-b, 130, 103a-b that are stackable above bottom cable management tray 112 described above in FIG. 8, are respectively depicted. The intermediate cable management tray 132 is similarly stackable above the intermediate cable management tray 122 of FIG. 9. Both intermediate cable management trays 122, 132 include a corresponding T-shape at front portions 726, 736 that are formed together with corresponding elongated sections 127, 137, followed by one or more corresponding arms 728, 129, 738, 139 extending at corresponding back portions 125, 135 of the cable management trays 122, 132.

The back portions 125, 135, corresponding front portions 726, 736, and corresponding elongated sections 127, 137 of the intermediate cable management trays 122, 132 can individually have corresponding planar top surfaces 127a-c, 137a-c that are generally parallel to each other. Furthermore, the elongated sections 127, 137 may each include a tunnel 925, 1025 that receives the arrangement of interior fiber optic cables 110, 120, positioned on the elongated section 117, 127 on the cable management trays 112, 122 immediately below. For example, the elongated section 137 for cable management tray 132 can includes the tunnel 1025 that is of sufficient height to bridge over interior fiber optics cables 110, 120, 120a-b that traverse elongated sections 117, 127 of corresponding cable management trays 112, 122.

It is contemplated that each portion of the intermediate cable management trays 122, 132 can be shaped differently than depicted in FIGS. 9 and 10. For example, the front portions 726, 736 can be shaped to conform with a front panel of a layered cabling component of a network device. Furthermore, the supporting surfaces 123a-c, 133a-c of the three portions of the intermediate cable management trays 122, 132 are sized to allow for at least the minimum bending radius and assembly sequencing of the arrangement of interior fiber optic cables 120, 120a-b, 130, 130a-b.

Figure 11:
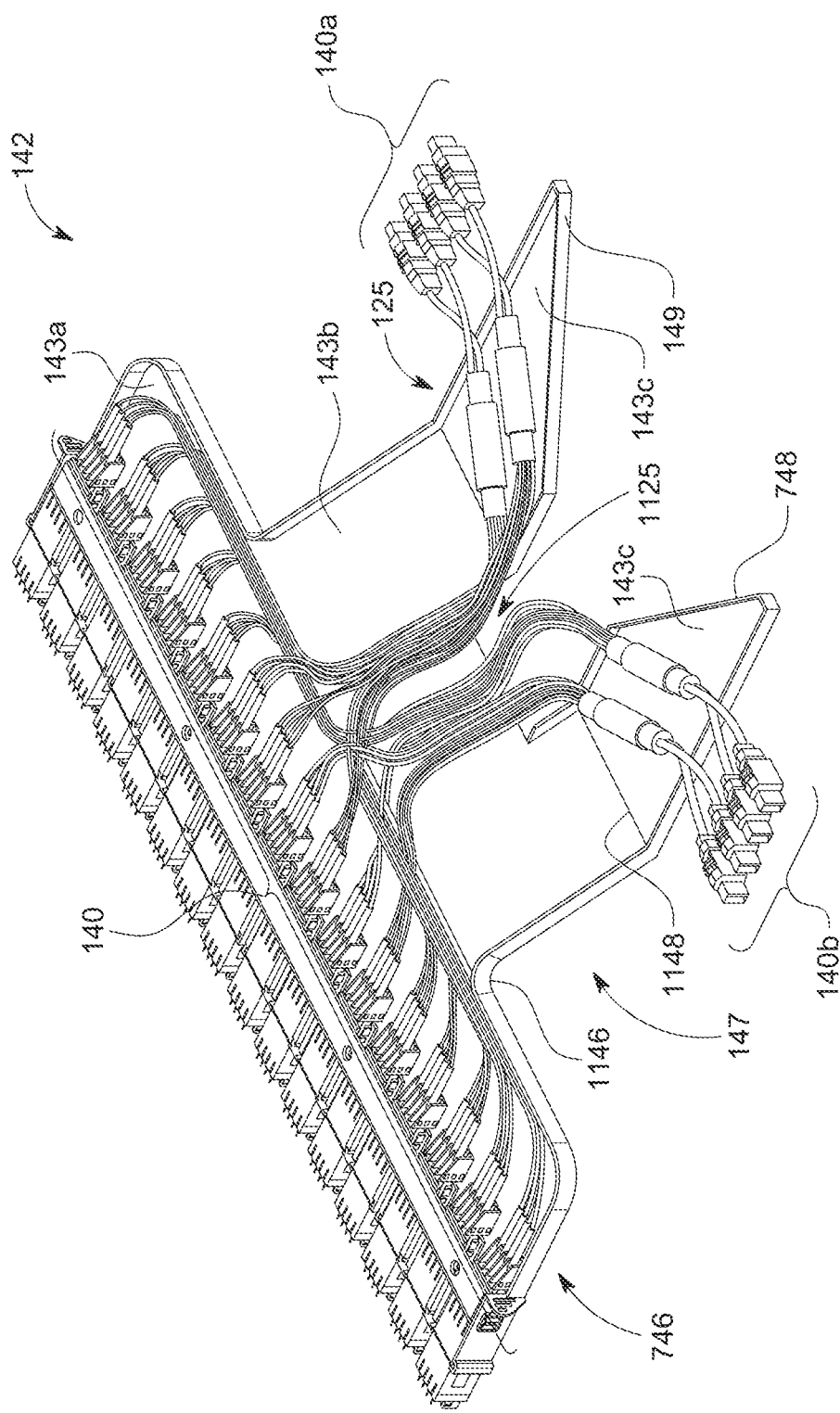
FIG. 11 is a rear perspective view of an exemplary top cable management tray and arrangement of interior fiber optic cables that are stackable above the cable management trays of FIGS. 8 to 10, according to certain aspects of the present disclosure.

Referring now to FIG. 11, a rear perspective view is depicted of a top cable management tray 142 and arrangement of interior fiber optic cables 140, 140a-b that is stackable above the cable management trays 112, 122, 132 of FIGS. 8 to 10.

The top cable management trays 142 includes a T-shape at a front portion 746 that is formed together with a corresponding elongated section 147 that is wider than elongated sections 117, 127, 137, followed by one or more arms 748, 149 extending from the elongated section 147 at a back portion 145 of the top cable management tray 142. The back portion 145 and front portion 746 of the top cable management tray 142 can individually have planar top surfaces 147a, 147c that are generally parallel to each. The elongated section 147 connects and extends between the back portion 145 and the front portion 746 at an angle and is not along a plane parallel to the back portion 145 or the front portion 746. The interface between the back portion 145 and the elongated section 147 can have a first bend 1146 in forming the connection between the two structures. Similarly, the interface between the front portion 746 and the elongated section 147 can also have a second bend 1148 to form the connection between the two structures.

Furthermore, the elongated section 147 may include an aperture 1125 that allows the passage of the arrangement of interior fiber optic cables 110, 120, 120a-b, 130, 130a-b positioned on the elongated sections 117, 127, 137 on the cable management trays 112 122, 132 immediately below. For example, the elongated section 147 for cable management tray 142 can include an aperture 1125 that is of sufficient height to bridge over interior fiber optics cables 110, 120, 120a-b, 130, 130a-b that traverse elongated sections 117, 127, 137 of corresponding cable management trays 112, 122, 132.

It is contemplated that each portion of the top cable management tray 142 can be shaped differently than depicted in FIG. 11. For example, the front portion 746 can be shaped to conform with a front panel 164 of a layered cabling component 100 of a network device. Furthermore, the supporting surfaces 143a-c of the three portions of the top cable management tray 142 are sized to allow for at least the minimum bending radius and assembly sequencing of the arrangement of interior fiber optic cables 140, 140a-b.

Figure 12:
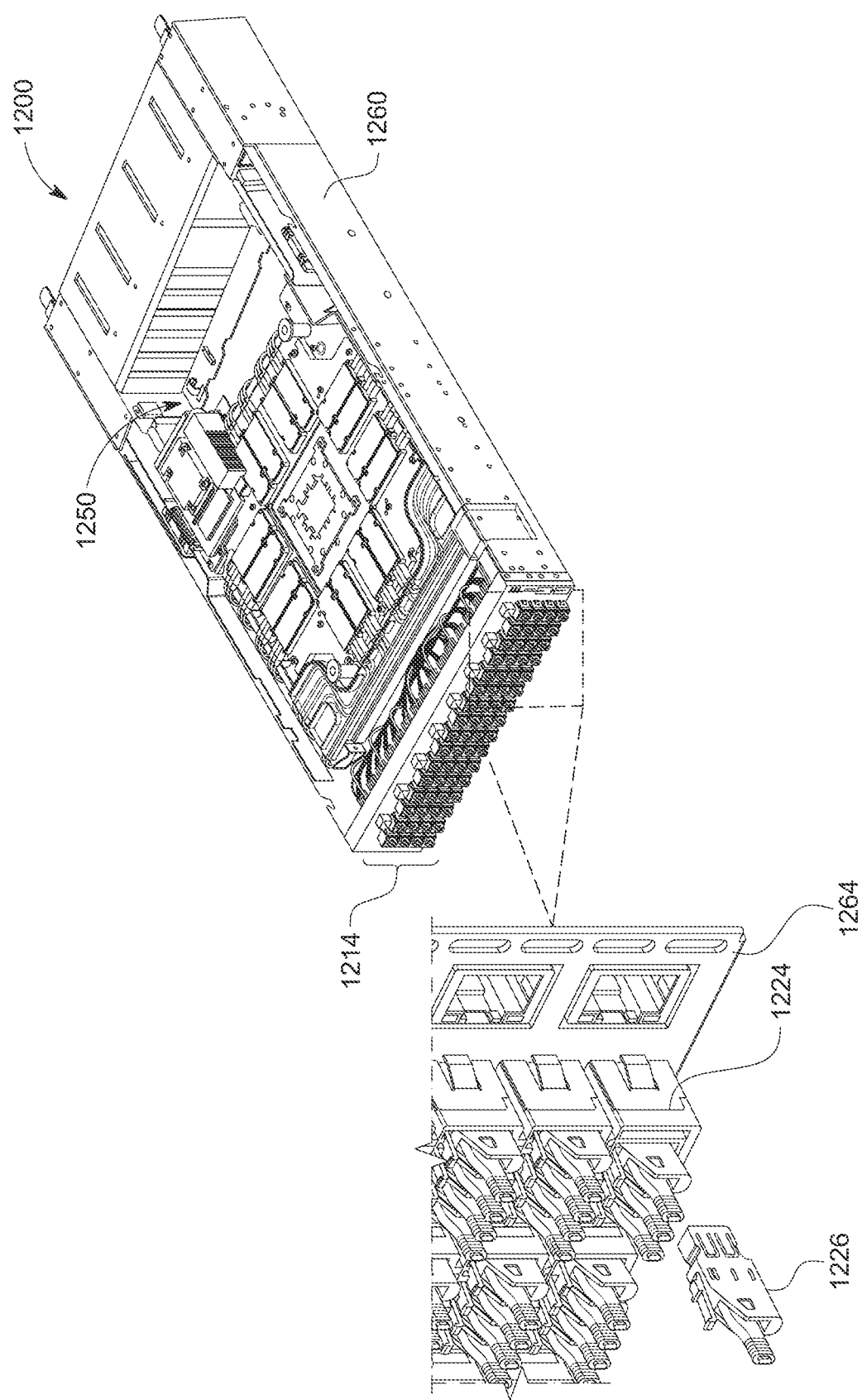
FIG. 12 is a front perspective view of the exemplary network device including the combined module and layered cabling component of FIG. 3 disposed within the interior space of a chassis housing for the network device, according to certain aspects of the present disclosure.

Referring to FIG. 12, a front perspective view is depicted of a network device 1200 including the combined module 200 and layered cabling component of FIG. 3 disposed within the interior space 1250 of a chassis housing 1260 for the network device 1200. The network device includes four horizontal rows of front fiber optic adapters 1214 that allow for the transmission of optical signal from the network device 1200 to external devices. FIG. 12 includes an enlarged view of the front fiber optic adapters, such as an exemplary fiber optic adapter 1224, which is secured to a front panel 1264 of the network device 1200. While different fiber optic adapters are contemplated, the fiber optic adapter can be an SN® adapter configured to receive a corresponding SN® duplex connector 1226, as manufactured by Senko Advanced Components, Inc. of Marlborough, Mass., connected to an external fiber optic cable (not shown) that can be connected to the external device (not shown) to facilitate communications from the network device 1200.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A network device including integrated optics, the network device comprising:
   a chassis including a front panel with a plurality of front fiber optic adapter openings, the chassis defining an interior space;
   a plurality of front fiber optic adapters disposed in the plurality of front fiber optic adapter openings;
   a plurality of arrangements of interior fiber optic cables disposed within the interior space, a first end of each interior fiber optic cable being directly connected to a corresponding one of the plurality of front fiber optic adapters; and
   a plurality of stacked cable management trays each supporting one of the plurality of arrangements of interior fiber optic cables, the plurality of stacked cable management trays configured to route a second end of each interior fiber optic cable to a corresponding side fiber optic adapter;
   wherein a front section of one of the stacked cable management trays includes a first horizontal row of adjacent receiving slots for individually securing each of the plurality of front fiber optic adapters.

2. The network device of claim 1, wherein the network device is a switch including a switch module comprising a motherboard, a central processing unit, an optical engine, a replication engine, and a forwarding engine.

3. The network device of claim 2, wherein the switch module is disposed above the plurality of stacked cable management trays.

4. The network device of claim 2, wherein the optical engine of the switch module is connected with a plurality of fiber optic pig tails, each fiber optic pig tail extending from the optical engine to a corresponding side fiber optic adapter.

5. The network device of claim 1, wherein the network device is a server including a server module comprising a motherboard, a central processing unit, an optical engine, and memory.

6. The network device of claim 5, wherein the server module is disposed above the plurality of stacked cable management trays.

7. The network device of claim 5, wherein the optical engine of the server module is connected with a plurality of fiber optic pig tails, each fiber optic pig tail extending from the optical engine to a corresponding side fiber optic adapter.

8. The network device of claim 1, wherein the plurality of stacked cable management trays includes at least three cable management trays.

9. The network device of claim 1, wherein the side fiber optic adapters are positioned on a side wall of the chassis and adjacent to each other along a horizontal plane parallel to a base of the chassis.

10. The network device of claim 9, wherein the side fiber optic adapters disposed in the side walls of the chassis are configured to receive optical signals as inputs from an optical engine.

11. The network device of claim 1, wherein the plurality of front fiber optic adapters includes SN® adapters configured to receive a corresponding SN® duplex connector.

12. The network device of claim 1, wherein a front section of a second one of the stacked cable management trays includes a second horizontal row of adjacent receiving slots stacked immediately above the first horizontal row.

13. The network device of claim 1, wherein the plurality of front fiber optic adapters disposed in the front fiber optic adapter openings are configured to provide optical signal outputs for receipt by a device external to the network device.

14. The network device of claim 1, wherein a lowest of the plurality of stacked cable management trays is substantially flat.

15. The network device of claim 1, wherein a highest of the plurality of stacked cable management trays has at least two bends in a supporting portion thereof.

16. The network device of claim 1, wherein an intermediate one of the plurality of stacked cable management trays includes an elongated support section disposed immediately above, and providing a tunnel for, fiber optic cables supported on an elongated support section of a lower one of the plurality of stacked cable management trays disposed below the intermediate one of the plurality of stacked cable management trays.

17. The network device of claim 1, wherein each of the plurality of front fiber optic adapters is configured to directly receive a corresponding connector of an external fiber optic cable.

18. A network device including integrated optics, the network device comprising:
   a chassis including a front panel with a plurality of front fiber optic adapter openings, the chassis defining an interior space;
   a plurality of front fiber optic adapters disposed in the plurality of front fiber optic adapter openings;
   a plurality of arrangements of interior fiber optic cables disposed within the interior space, a first end of each interior fiber optic cable being directly connected to a corresponding one of the plurality of front fiber optic adapters; and
   a plurality of stacked cable management trays each supporting one of the plurality of arrangements of interior fiber optic cables, the plurality of stacked cable management trays configured to route a second end of each interior fiber optic cable to a corresponding side fiber optic adapter;

wherein an intermediate one of the plurality of stacked cable management trays includes an elongated support section disposed immediately above, and providing a tunnel for, fiber optic cables supported on an elongated support section of a lower one of the plurality of stacked cable management trays disposed below the intermediate one of the plurality of stacked cable management trays.

\* \* \* \* \*